US011932176B2

(12) United States Patent
Esper

(10) Patent No.: US 11,932,176 B2
(45) Date of Patent: Mar. 19, 2024

(54) T-FLANGE SNAP FIT FOR OUTER BELT AND DLO ASSEMBLIES TO APPLIQUE

(71) Applicant: Magna Exteriors Inc., Concord (CA)

(72) Inventor: Mark F. Esper, Royal Oak, MI (US)

(73) Assignee: Magna Exteriors Inc., Aurora (CA)

( * ) Notice: Subject to any disclaimer, the term of this patent is extended or adjusted under 35 U.S.C. 154(b) by 288 days.

(21) Appl. No.: 17/396,222

(22) Filed: Aug. 6, 2021

(65) Prior Publication Data
US 2022/0041119 A1 Feb. 10, 2022

Related U.S. Application Data

(60) Provisional application No. 63/062,880, filed on Aug. 7, 2020.

(51) Int. Cl.
B60R 13/02 (2006.01)
B60R 13/04 (2006.01)

(52) U.S. Cl.
CPC .......... *B60R 13/0206* (2013.01); *B60R 13/04* (2013.01)

(58) Field of Classification Search
CPC .......... B60R 13/02; B60R 3/04; B60J 5/0402; B60J 10/70; F16B 2/22; F16B 2/071; F16B 2/076

USPC ........................................................ 52/716.6
See application file for complete search history.

(56) References Cited

U.S. PATENT DOCUMENTS

| | | | |
|---|---|---|---|
| 6,748,702 B2 * | 6/2004 | Jang ................. | B60J 10/30 428/131 |
| 6,918,223 B2 * | 7/2005 | Neidlein ................. | B60R 13/04 52/716.5 |
| 7,044,524 B2 * | 5/2006 | Luetze .................... | B60R 13/04 52/716.6 |
| 8,474,214 B2 * | 7/2013 | Dawe .................... | F16B 5/0664 52/716.5 |
| 9,114,765 B1 * | 8/2015 | James ..................... | B60R 13/04 |
| 2006/0193678 A1 * | 8/2006 | Wilson ................. | A63B 71/028 403/49 |
| 2013/0292965 A1 * | 11/2013 | Prater ..................... | B60J 10/76 29/428 |
| 2014/0373475 A1 * | 12/2014 | Muskovac ............... | F16B 5/12 52/468 |
| 2017/0057428 A1 * | 3/2017 | Maliskey ............... | B60J 5/0468 |
| 2018/0244215 A1 * | 8/2018 | Husek ........................ | B60J 1/10 |
| 2019/0084499 A1 * | 3/2019 | Pinon Perez ....... | B60R 13/0206 |
| 2020/0369138 A1 * | 11/2020 | Murar ................... | B60J 10/265 |

* cited by examiner

Primary Examiner — Robert Sandy
Assistant Examiner — Rowland Do
(74) Attorney, Agent, or Firm — Warn Partners, P.C.

(57) ABSTRACT

A T-flange with a snap fit feature will ensure a tight fit once the operator overcomes the snap feature.

8 Claims, 5 Drawing Sheets

T-FLANGE SNAP FIT FOR OUTER BELT AND DLO ASSEMBLIES TO APPLIQUE

CROSS-REFERENCE TO RELATED APPLICATIONS

This patent application claims the benefit of U.S. Provisional Application Ser. No. 63/062,880, filed Aug. 7, 2020. The disclosure of which is incorporated herein by reference.

FIELD OF THE INVENTION

The present invention relates to a T-flange snap fit for outer belt and DLO assemblies to applique.

BACKGROUND OF THE INVENTION

In automotive assembly manufacturing, tolerances and detail as to final fit on vehicles is very important. Elongated trim pieces are used to provide finished surfaces around windows and doors in vehicles. Pieces of trim may need to be butted end to end in some areas. These areas of connecting trim pieces are hard to align and main proper desired fit. Inconsistencies in joint fits based on variation in manufactured parts is a common problem in such assemblies.

For instance, when installing the outerbelt to an applique it becomes reliant on the operator to push the outerbelt to the applique to ensure there is no gap. There is also the part-to-part alignment that must be tuned to each other.

Therefore, it is an objective to ensure a clean tight fit between parts and assemblies during installation.

SUMMARY OF THE INVENTION

A T-flange with a snap fit feature will ensure a tight fit once the operator overcomes the snap feature. The T-flange allows for tuning of the outerbelt fit to the applique by the use of tuning ribs in the joint clip to allow up/down, inboard/outboard or twist fine tuning.

A flange connector assembly for connecting trim pieces of a vehicle each having a longitudinal cavity. The assembly first portion having an end fitting into a cavity on a first side and second portion fitting into a cavity of a trim part to be attached. The first portion has a connection portion, and the second portion has a second connecting portion. The first connecting portion and the second connecting portion snap fit to engage each other and retain the trim portion to be attached in a proper orientation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
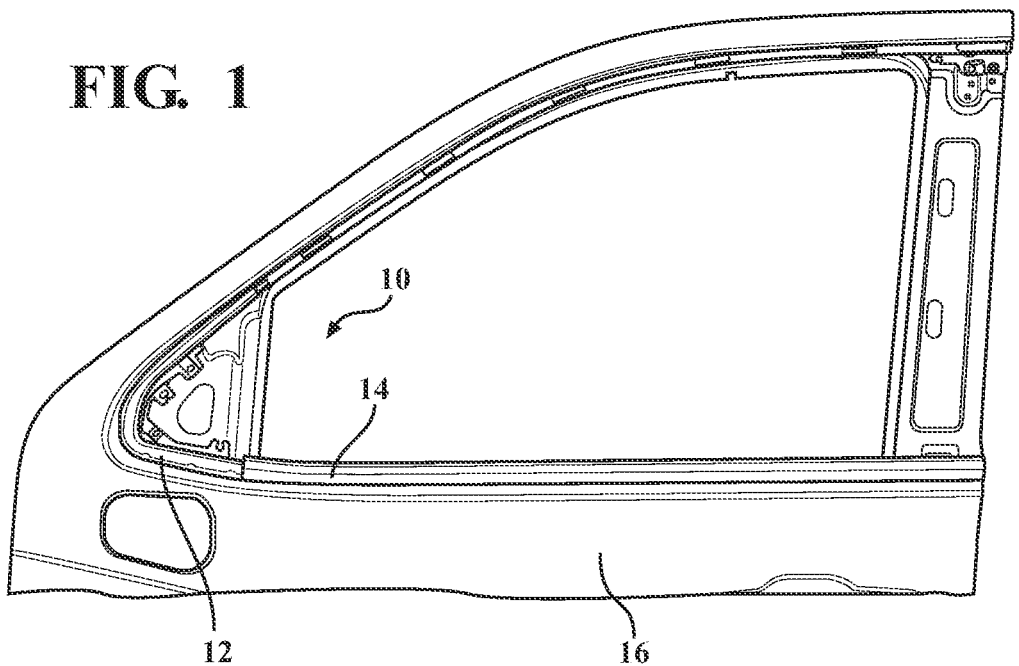
FIG. 1 is a perspective view of a door trim structure wherein the flange connector assembly is used to connect adjacent trim pieces.
Figure 2:
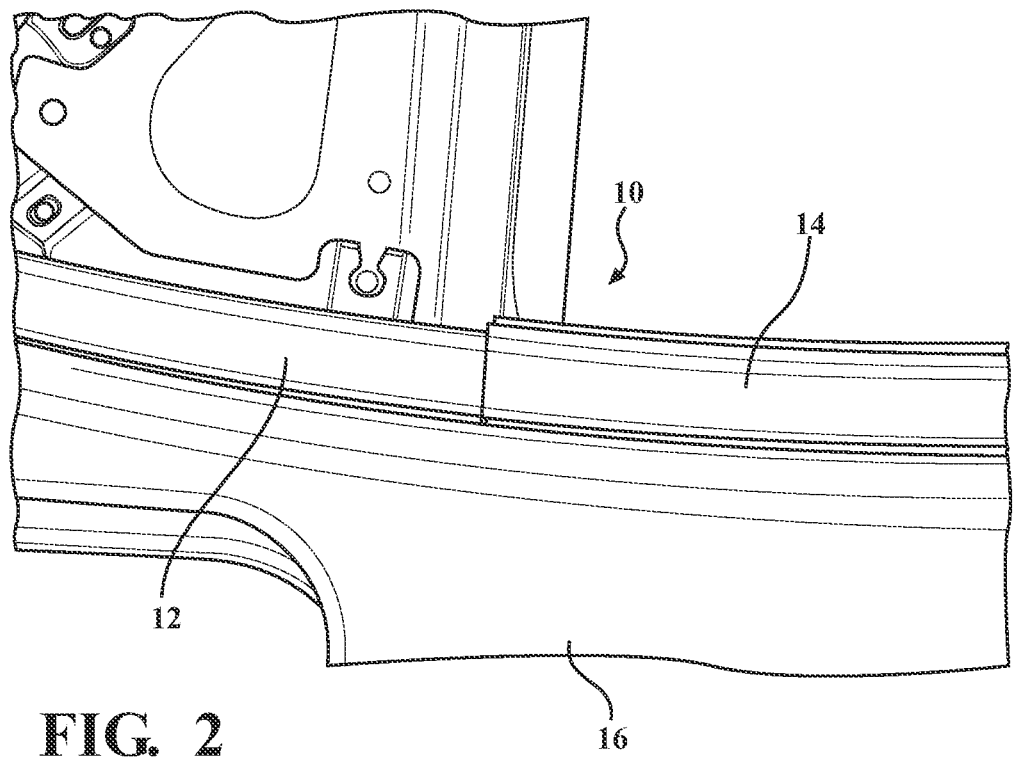
FIG. 2 is a detailed view of the attachment area circled in FIG. 1.
Figure 3:
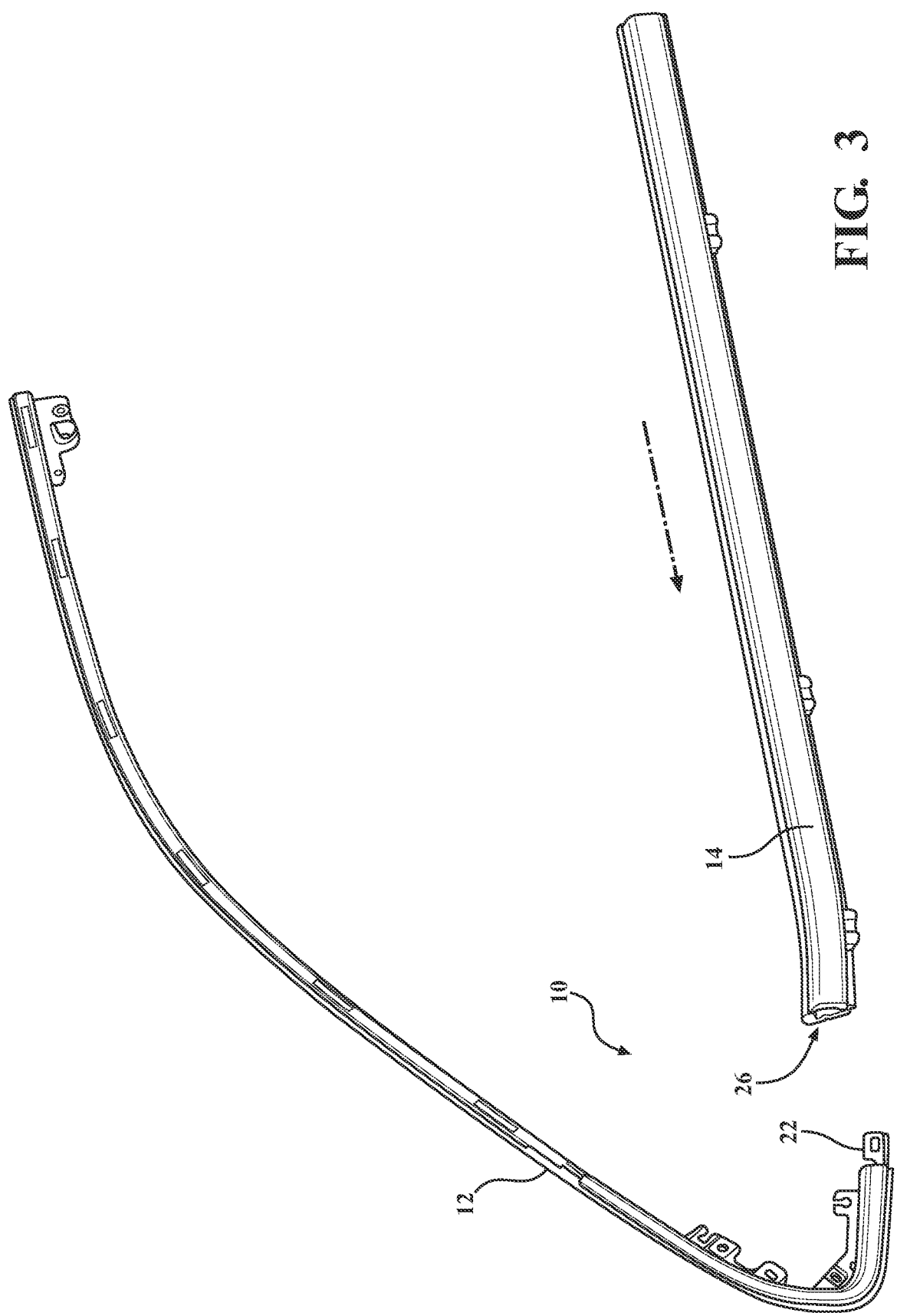
FIG. 3 is a perspective assembly view of the outerbelt and stamping applique joint area.
Figure 6:
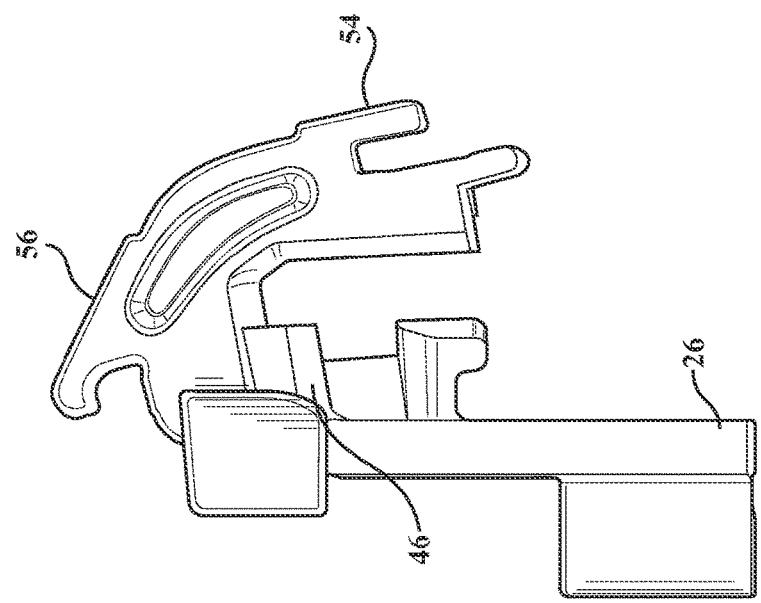
FIG. 6 is an end view of the female clip portion of FIG. 5.
Figure 4:
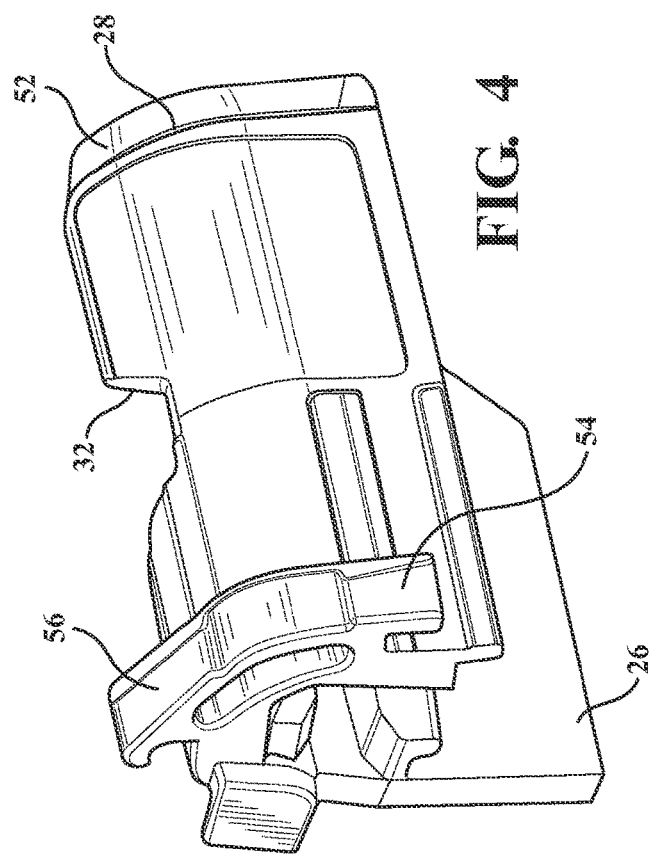
FIG. 4 is a perspective view of the female clip portion of the present invention.
Figure 5:
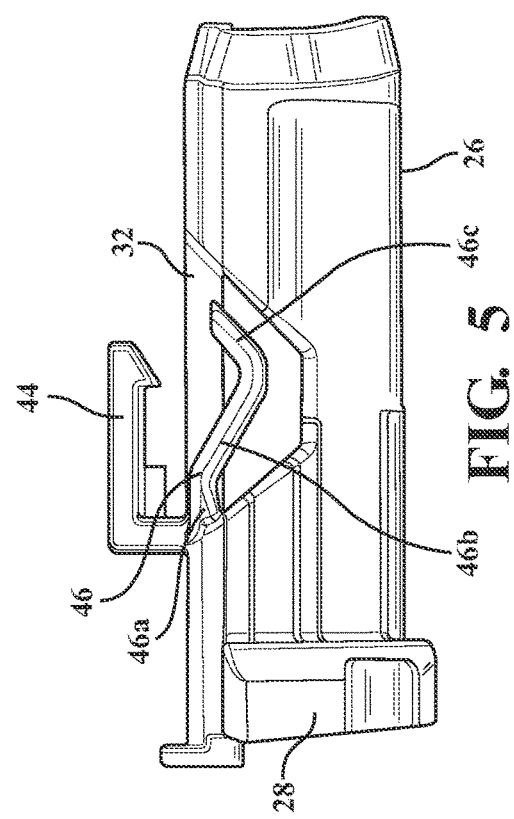
FIG. 5 is a side view of the female clip portion of FIG. 4.
Figure 9:
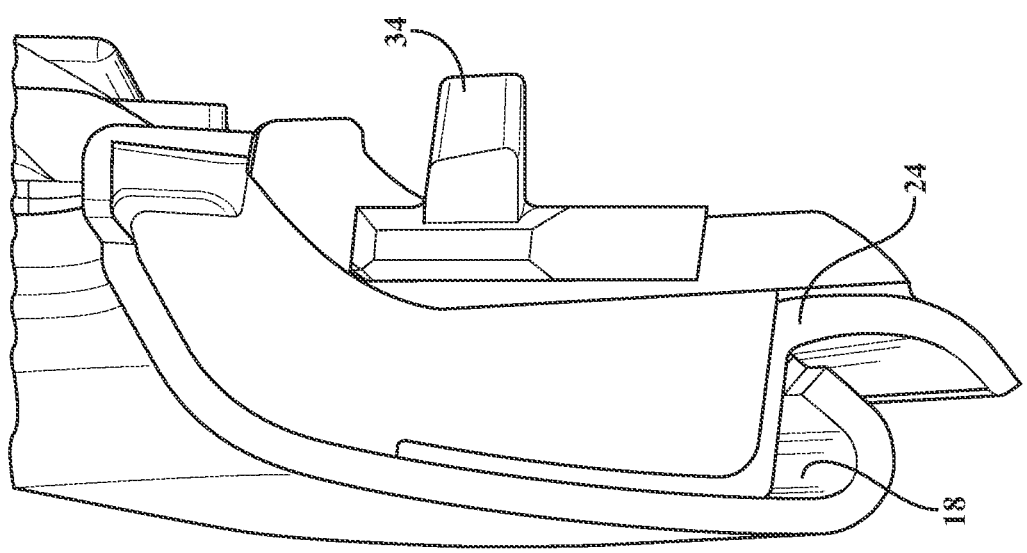
FIG. 9 is a sectional view of the end view of the connection of FIG. 7.
Figure 7:
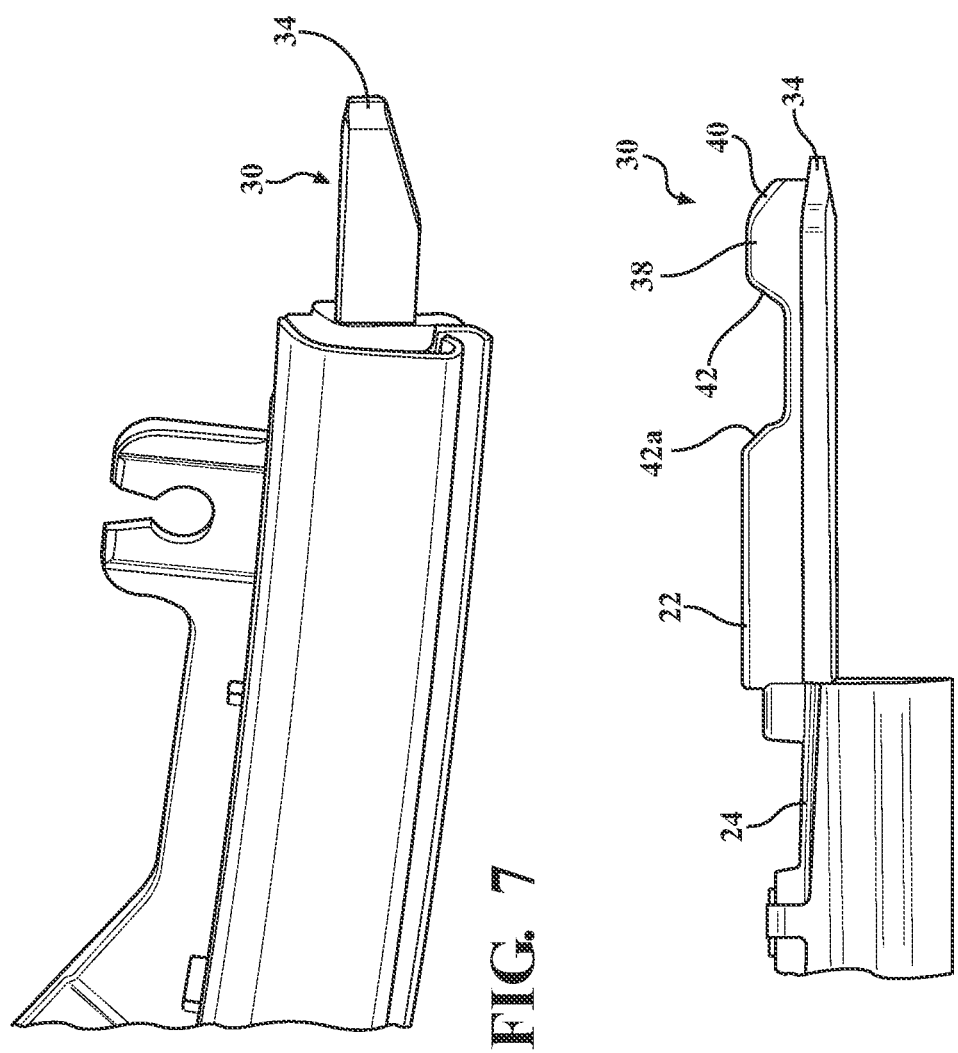
FIG. 7 is a perspective view of the male clip portion of the flange connector assembly of the present invention.
Figure 8:
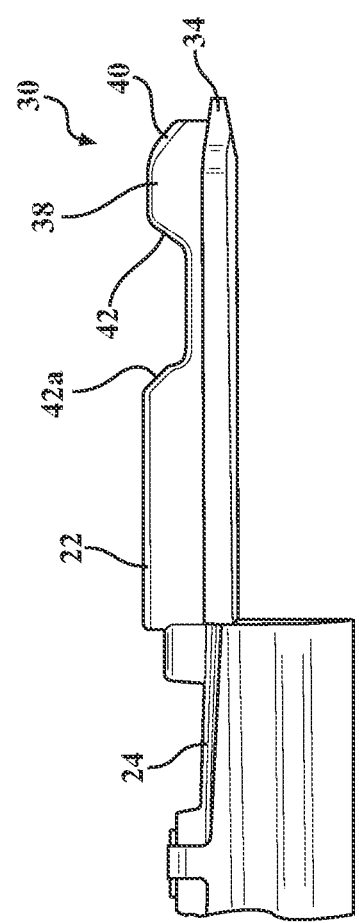
FIG. 8 is a side view of the male clip portion of shown in FIG. 7.
Figure 10:
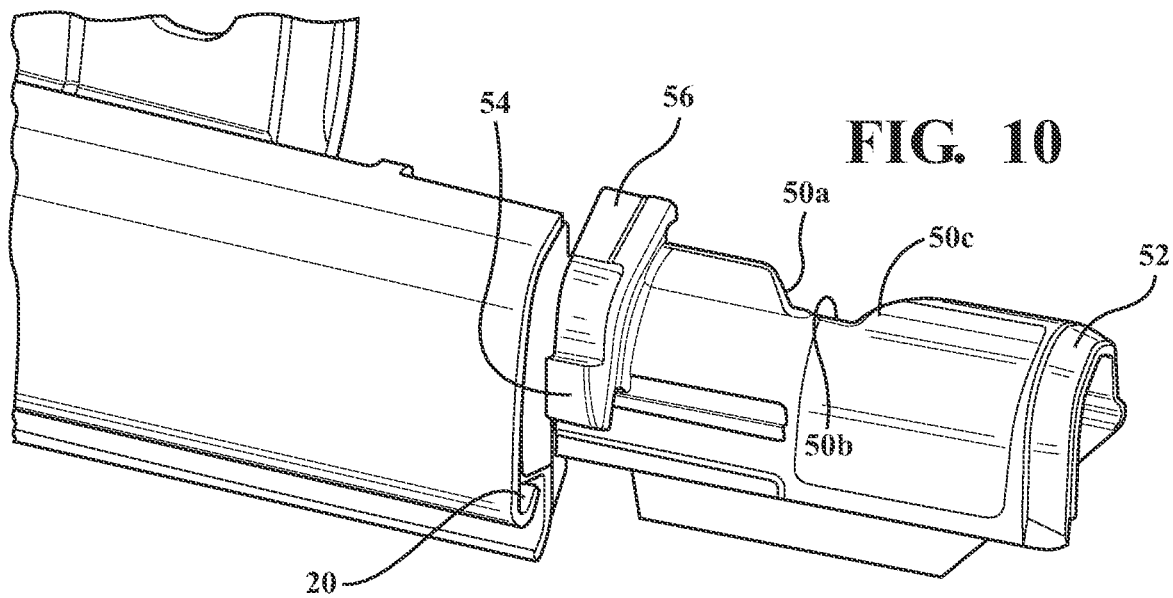
FIG. 10 is a perspective view of the flange connector assembly with both male and female connectors connected together (but not showing the outer belt for purposes of illustration.
Figure 11:
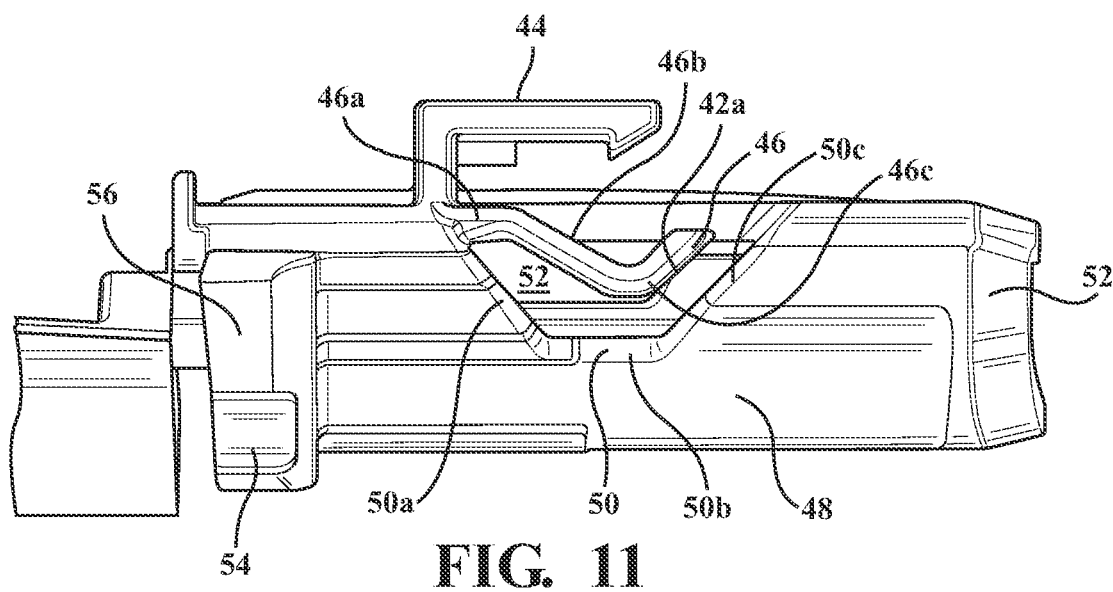
FIG. 11 is a side view of the assembly of FIG. 10.
Figure 12:
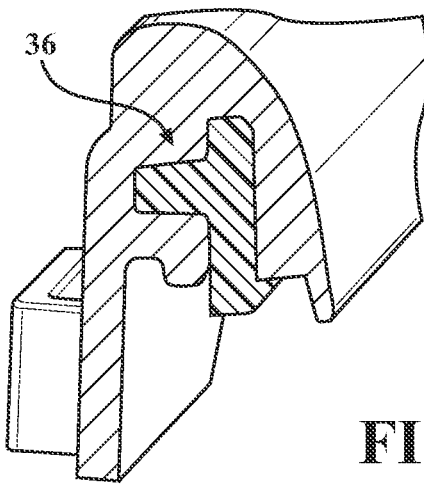
FIG. 12 is a sectional view showing the male T-shaped protrusion in the female connector.

The following description of the preferred embodiment(s) is merely exemplary in nature and is in no way intended to limit the invention, its application, or uses.

The description of the invention is merely exemplary in nature and, thus, variations that do not depart from the essence of the invention are intended to be within the scope of the invention. Such variations are not to be regarded as a departure from the spirit and scope of the invention.

A flange connector assembly is shown generally at 10. The flange connector assembly 10 is for connecting trim pieces 12 and 14 of a vehicle 16. Each trim piece 12 and 14 have a longitudinal cavity 18 and 20 respectively.

The flange connector assembly 10 includes A first portion 22 having an end 24 fitting into cavity 18 (or integrally molded or over molded) on a first end of a first side of a trim piece and second portion 26 having and end 28 fitting into a cavity 20 (or integrally molded or over molded into) a trim part 14 to be attached where in the first portion 22 has a connection portion 30 and the second portion 26 has a second connecting portion 32 wherein the first connecting portion 30 and the second connecting portion 32 snap fit to engage each other and retain the trim portions 12 and 14 to be attached.

The first portion 22 has a male T-shaped protrusion 34 and the second portion 26 has a receiving portion 36 for receiving the male portion and locking it in a secured position. The T-shaped member has a protrusion 38 including a ramp portion 40 and a locking portion 42. The second portion 26 has a receiving portion 36 including a deflectable arm 44 and a locking portion 46. The locking portion 46 is deflectable by ramp portion 40 and engages locking portion 42 with a surface 42a for the portion 46 to rest against in the locking position. This configuration allows the members 24 and 26 to lock together in position to form the assembly and assure a proper predetermined alignment of the final trim assembly. The locking by the arm 44 and the abutment with the surface 42a provides for a secure reproducible assembly with consistent tuned alignment.

The outer surface 48 of the receiving portion 36 mirrors the contour of the inner surface of the trim piece 12 and has an opening 50 defined by walls 50a, 50b, and 50c. the deflectable locking portion 46 is molded integrally with the receiving portion to extend and deflect within the opening.

The locking portion 46 includes a base leg 46a, extending from the wall 50a and then an intermediate leg 46b extending into an interior area 52 of the opening 50 for allowing deflection of the locking portion. The ramp angled portion 46c is angled from the intermediate leg to provide a ramp for deflection during insertion of the mail portion into the connector.

The connector also includes an end insertion ramp surface 52 which is angled inward to provide easier insertion into the mating piece. Locking bearing surfaces such as 54 and 56 are provided for securing the connector against the inside surface 20 of the part. Arm 44 deflects into a catch on the part to be connected to in order to lock the assembly together.

The T-flange portion itself in combination with contact ribs are provided for adjustment of the pieces during securement. The snap fit will ensure a tight fit once the operator overcomes the snap feature. The T-flange allows for tuning of the outerbelt fit to the applique by the use of tuning ribs in the joint clip to allow up/down, inboard/outboard or twist fine tuning. This feature is set forth in co-pending application U.S. Ser. No. 63/062,864 now PCT/US2021/036178. which is incorporated by reference herein.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A flange connector assembly for connecting trim pieces of a vehicle, each trim piece having a longitudinal cavity, said flange connector assembly comprising: a first portion having a trim end fitting into a first cavity on a first trim piece side and a T-shaped protrusion including a second receiving portion for fitting into a second trim end piece said second portion which includes a female cavity portion for receiving the T-shaped protrusion and surfaces for providing a two point locking system between the ramp surface and the locking portion and the T-shaped protrusion when the connectors are fitted together, wherein the first portion and the second portion snap fit to engage each other and retain the trim pieces to be attached wherein the two point locking system includes the first portion having the T-shaped protrusion including a ramp portion and a locking portion and the second portion having a receiving portion including a deflectable arm for engagement with the locking portion for receiving a male portion and locking it in a secured position.

2. The flange connector assembly of claim 1 wherein contact ribs are provided on said T-shaped protrusion for adjustment of the pieces during securement.

3. The flange connector assembly of claim 1 wherein the female cavity portion includes a form following outer surface with an opening therein including said deflectable arm that is integrally molded to extend into the opening with a ramp for deflecting over a locking portion in the T-shaped protrusion.

4. The flange connector assembly of claim 3 wherein the deflectable arm includes a first leg connected to the opening, an intermediate leg extending into the opening and a ramp leg for providing deflection during insertion of the T-shaped protrusion.

5. The flange connector assembly of claim 4 wherein the ramp leg is held in engagement with a surface on the male portion in a first direction by a lock portion on the ramp for holding against movement in a second direction.

6. A flange connector assembly for connecting trim pieces of a vehicle, each trim piece having a longitudinal cavity, said flange connector comprising: a first portion having a trim end, said trim end fitting into a first cavity on a first trim piece side and a second portion having a T-shaped cross section with three outwardly extending legs a second receiving portion on one of the T-shaped legs, said receiving portion including an inwardly slanted bearing surface said portion for fitting into a second trim end piece which includes a female cavity portion, said female cavity portion including a deflectable inwardly extending arm with a retention leg which deflects and seats against the ramp surface of the first portion, when the parts are axially pushed together; a locking portion on a ramp surface of one of the first portion or second portion and a deflectable arm is provided on the other of the first portion or second portion tang which locks the members together with the locking portion of the ramp surface engaging the deflectable arm for providing a two point locking system between the ramp surface and the locking portion of the deflectable arm when the first portion and second portion are fitted together, wherein the first portion and the second portion snap fit to engage each other and retain the trim pieces to be attached in a repeatable predetermined fit arrangement.

7. The flange connector assembly of claim 6 wherein the deflectable arm is provided on the first portion said second portion having a locking surface for receiving a arm.

8. The flange connector assembly of claim 6 wherein the deflectable arm is provided on the second portion and said first or portion having a locking surface for receiving said deflectable arm.

* * * * *